United States Patent
Jawahar et al.

(10) Patent No.: US 12,450,878 B2
(45) Date of Patent: Oct. 21, 2025

(54) SYSTEM AND METHOD FOR DETECTING OBJECT IN AN ADAPTIVE ENVIRONMENT USING A MACHINE LEARNING MODEL

(71) Applicants: International Institute of Information Technology, Hyderabad, Hyderabad (IN); Indian Institute of Technology, Delhi, New Delhi (IN); Indian Institute of Technology, Hyderabad, Sangareddy (IN)

(72) Inventors: C. V. Jawahar, Hyderabad (IN); Rohit Saluja, Hyderabad (IN); Chetan Arora, New Delhi (IN); Vineeth N Balasubramanian, Sangareddy (IN); Vaishnavi Mohan Khindkar, Hyderabad (IN)

(73) Assignees: INTERNATIONAL INSTITUTE OF INFORMATION TECHNOLOGY, HYDERABAD, Hyderabad (IN); INDIAN INSTITUTE OF TECHNOLOGY, DELHI, New Delhi (IN); INDIAN INSTITUTE OF TECHNOLOGY, HYDERABAD, Sangareddy (IN)

( * ) Notice: Subject to any disclaimer, the term of this patent is extended or adjusted under 35 U.S.C. 154(b) by 268 days.

(21) Appl. No.: 18/197,075

(22) Filed: May 14, 2023

(65) Prior Publication Data

US 2023/0368498 A1    Nov. 16, 2023

(30) Foreign Application Priority Data

May 14, 2022    (IN) ............................. 202241027805

(51) Int. Cl.
*G06V 10/77* (2022.01)
*G06F 18/213* (2023.01)
(Continued)

(52) U.S. Cl.
CPC ........ *G06V 10/7715* (2022.01); *G06F 18/213* (2023.01); *G06F 18/24* (2023.01);
(Continued)

(58) Field of Classification Search
CPC .. G06V 10/7715; G06V 10/80; G06V 10/806; G06V 10/454; G06V 10/764;
(Continued)

(56) References Cited

PUBLICATIONS

Templeman, Invariant Feature Maps: A Theory of how Complex Cells of the Visual Cortex Learn to Generalize Over Temporal Variation (Dissertation), May 1992 [retrieved Jun. 10, 2025], George Washington University, 248 pages. DOI: 10.13140/2.1.1798.9922 (Year: 1992).*

(Continued)

*Primary Examiner* — Henok Shiferaw
*Assistant Examiner* — Dennis Rosario

(57) ABSTRACT

A method for detecting object in an image in a target environment that is adapted to a source environment using a machine learning model is provided. The method includes (i) extracting features from source image associated with source environment and target image associated with target environment, (ii) generating a feature map based on the features, (iii) generating a pixel-wise probability output map (iv) determining a first environment invariant feature map by combining the feature map with the pixel-wise probability output map, (v) determining a second environment invariant feature map by combining the first environment invariant feature map and the features, (vi) generating environment invariant feature maps at different instances, (vii) extracting environment invariant features based on the environment invariant feature maps, (viii) detecting the object in the image in the target environment that is adapted to the source environment by training the machine learning model using the environment invariant features.

20 Claims, 8 Drawing Sheets

(51) Int. Cl.

| | | |
|---|---|---|
| *G06F 18/24* | (2023.01) | |
| *G06F 18/25* | (2023.01) | |
| *G06N 3/08* | (2023.01) | |
| *G06N 5/04* | (2023.01) | |
| *G06N 20/00* | (2019.01) | |
| *G06T 5/60* | (2024.01) | |
| *G06T 7/246* | (2017.01) | |
| *G06V 10/20* | (2022.01) | |
| *G06V 10/40* | (2022.01) | |
| *G06V 10/70* | (2022.01) | |
| *G06V 10/74* | (2022.01) | |
| *G06V 10/764* | (2022.01) | |
| *G06V 10/80* | (2022.01) | |
| *G06V 10/82* | (2022.01) | |
| *G06V 20/00* | (2022.01) | |
| *G06V 20/05* | (2022.01) | |
| *G06V 20/10* | (2022.01) | |
| *G06V 20/40* | (2022.01) | |
| *G06V 20/69* | (2022.01) | |
| *G06V 30/19* | (2022.01) | |

(52) U.S. Cl.
CPC ............ *G06F 18/25* (2023.01); *G06F 18/251* (2023.01); *G06F 18/253* (2023.01); *G06F 18/254* (2023.01); *G06N 3/08* (2013.01); *G06N 5/04* (2013.01); *G06N 20/00* (2019.01); *G06T 5/60* (2024.01); *G06T 7/251* (2017.01); *G06V 10/255* (2022.01); *G06V 10/40* (2022.01); *G06V 10/70* (2022.01); *G06V 10/761* (2022.01); *G06V 10/764* (2022.01); *G06V 10/765* (2022.01); *G06V 10/80* (2022.01); *G06V 10/806* (2022.01); *G06V 10/809* (2022.01); *G06V 10/82* (2022.01); *G06V 20/00* (2022.01); *G06V 20/05* (2022.01); *G06V 20/10* (2022.01); *G06V 20/35* (2022.01); *G06V 20/38* (2022.01); *G06V 20/41* (2022.01); *G06V 20/47* (2022.01); *G06V 20/698* (2022.01); *G06V 30/19173* (2022.01)

(58) Field of Classification Search
CPC ...... G06V 10/774; G06V 10/82; G06V 20/56; G06V 2201/07; G06V 20/58; G06V 10/44; G06V 40/172; G06V 10/40; G06V 10/42; G06V 10/462; G06V 20/00; G06V 20/50; G06V 10/255; G06V 20/588; G06V 20/47; G06V 20/698; G06V 10/147; G06V 20/582; G06V 20/586; G06V 20/584; G06V 20/46; G06V 2201/08; G06V 20/41; G06V 10/761; G06V 20/35; G06V 20/38; G06V 20/39; G06V 20/36; G06V 20/625; G06V 40/171; G06V 10/765; G06V 20/176; G06V 20/54; G06V 20/52; G06V 20/53; G06V 30/19173; G06V 10/809; G06V 20/80; G06V 40/168; G06V 10/70; G06V 20/05; G06V 20/10; G06T 2207/20084; G06T 2207/20081; G06T 5/60; G06T 2207/30252; G06T 2207/30256; G06T 2207/30261; G06T 2207/30264; G06T 7/73; G06T 7/75; G06T 2207/20212; G06T 2207/20221; G06T 7/246; G06T 7/251; G06T 2207/30248; G06N 3/08; G06N 20/00; G06N 20/20; G06N 5/04; G06F 18/214; G06F 18/23; G06F 18/24; G06F 18/253; G06F 18/25; G06F 18/251; G06F 18/254; G06F 18/213; G06F 18/211

See application file for complete search history.

(56) References Cited

PUBLICATIONS

Meng et al., Cross-Domain Communications Between Agents Via Adversarial-Based Domain Adaptation in Reinforcement Learning, Aug. 11, 2022 [retrieved Jun. 10, 2025], ICC 2022—IEEE International Conference on Communications, pp. 413-418. DOI: 10.1109/ICC45855.2022.9838583 (Year: 2022).*

Gawande et al., SIRA: Scale illumination rotation affine invariant mask R-CNN for pedestrian detection, Jan. 13, 2022 [retrieved Jun. 10, 2025], Applied Intelligence, vol. 52, pp. 10398-10416. DOI: https://doi.org/10.1007/s10489-021-03073-z (Year: 2022).*

Shen et al., UWSOD: toward fully-supervised-level capacity weakly supervised object detection, Dec. 6, 2020 [retrieved Jun. 10, 2025], NIPS'20: Proceedings of the 34th International Conference on Neural Information Processing Systems, Article No. 588, 15 pages. (Year: 2020).*

[item X continued] Retrieved: https://dl.acm.org/doi/abs/10.5555/3495724.3496312 (Year: 2020).*

Nataraju et al., An Integrated Approach to Visual Attention Modeling for Saliency Detection in Videos, 2011 [STIC retrieved Jun. 10, 2024], Machine Learning for Vision-Based Motion Analysis, pp. 181-214. https://doi.org/10.1007/978-0-85729-057-1 (Year: 2011).*

* cited by examiner

SYSTEM AND METHOD FOR DETECTING OBJECT IN AN ADAPTIVE ENVIRONMENT USING A MACHINE LEARNING MODEL

CROSS-REFERENCE TO RELATED APPLICATIONS

This patent application claims priority to pending Indian provisional patent application no. 202241027805 filed on May 14, 2022, the complete disclosures of which, in their entirety, are hereby incorporated by reference.

BACKGROUND

Technical Field

The embodiments herein generally relate to an environment-adaptive object detection model, and more specifically to a system and a method for detecting the object in an image in a target environment that is adapted to a source environment using a machine learning model.

Description of the Related Art

Object detection and recognition are fundamental tasks in the field of computer vision, designed to analyze visual data and extract features from digital images or video frames. The object detection and recognition processes hold significant importance across diverse domains, including surveillance, autonomous vehicles, augmented reality, and biometrics. The object detection is used to identify the presence of objects from a digital image or a video frame based on an object category. The object recognition identifies or verifies objects based on their visual characteristics from the digital image or the video frame based on the object category. For example, face detection and recognition, where a face of a person is detected and recognized. For instance, the features of the face can be extracted from the digital image and compared with features stored in a database in an attempt to recognize the face. In some cases, the extracted features are fed to a classifier and the classifier will give the identity of the input features. Despite of, the object detection and recognition are computationally demanding tasks that require significant time and resources for their execution.

Adaptive object detection focuses on minimizing the domain disparity between source and target images. Thus, an adaptive object detector trained on labeled source data can be transferred to a target domain. Even though, the adaptive object detection encounters challenges due to distributional shifts that occur along with a pipeline of the objection detection. Traditional solutions adopt adversarial learning methods to align image features at global and local levels, yet an instance-specific misalignment persists. The adaptive object detection further remains challenging due to a great amount of visual diversity being present in background scenes. Further, scenes have intricate combinations of objects that cause misalignment.

Existing two-stage detectors such as Faster R-CNN are widely used in domain adaptation. However, the two-stage detectors rely on a large amount of training data, which requires task-specific annotation efforts and is cost-intensive. Moreover, the effectiveness of the two-stage detectors is confined to label-rich domains where there is a lack of significant domain gaps or differences between training data and testing data and fails to generalize an object in universal settings or across diverse domains or with extreme variations in appearance, lighting conditions, or object characteristics due to dataset biases.

An existing domain adaptive faster R-CNN framework is adapting object detection models to new domains by considering differences between the training data and deployment conditions. However, the existing domain adaptation faster R-CNN framework relies on extensive training data with domain-specific annotations. The domain-specific annotations may be time-consuming, labor-intensive, and costly and this annotation may pose practical challenges in real-world applications. Moreover, the adaptive Faster R-CNN framework may not be as effective in achieving successful alignment as there are substantial differences in object appearance or distribution.

Another existing object detection system focuses on aligning globally similar images using an adversarial alignment loss. However, this method faced limitations when dealing with objects that had significantly different appearances.

A traditional object detection system focuses on categorical consistency or alignment between image-level and instance-level predictions by introducing an additional instance-level classifier as a regularizer to improve alignment. Moreover, the traditional object detection system requires more computational power during both the training process and inference stages, the training process is more complex and potentially increases the difficulty of finding the right set of parameters during object detection, as the traditional object detection system utilizes the additional instance-level classifier.

The existing object detection approach utilized Cycle-GAN to generate interpolated images to reduce global discriminability between domains, but may not effectively address extreme domain gaps which means, the interpolation process fails to reduce the domain gaps, if the domains differ significantly in terms of appearance, and object characteristics. Moreover, the CycleGAN requires more computational power for generating interpolated images.

The conventional method of a category-aware feature alignment system is a process of aligning features extracted from different domains for object detection and to preserve the discriminative information related to object categories. Furthermore, in the domain adaptation process, category information is frequently unavailable for target samples, which are the images or objects within the domain we aim to adapt to. The absence of category labels poses a challenge in guiding the alignment process using category-level information. Without the alignment process guidance, it becomes more difficult to effectively align the model to the target domain which hinders the adaptation process.

The existing object detection approach focuses on self-training paradigms of machine learning models that utilized pseudo-labels, which are inferred labels, as a substitute for ground truth to leverage unlabeled target data to reduce a domain gap. The inferred labels are assigned to unlabeled data based on the predictions of the machine learning models. The accuracy of inferred labels depends on the performance of the machine-learning model itself. If the machine learning models' predictions are incorrect or unreliable, the pseudo-labels generated can be inaccurate as well.

Another traditional object detection system utilizes task-specific semantic information to guide the pyramid to guide the process of selecting and weighing features at different scales to capture multi-scale features in images or videos. However, the dependency on task-specific semantic information in the traditional object detection system may restrict its flexibility and ability to generalize across various tasks or domains.

In real-world applications of object detection, adapting the machine learning models to different domains is challenging, and the domain shift problem arises when machine learning models are deployed under conditions that differ slightly from the training data. This means that the distribution of data in deployment may exhibit variations compared to the data used for training the machine learning models.

Accordingly, there remains a need of addressing the aforementioned technical problems using a system and method for reducing domain distance between source and target images.

SUMMARY

In view of the foregoing, an embodiment herein provides a processor-implemented for detecting at least one object in at least one image in a target environment that is adapted to a source environment using a machine learning model, thereby reducing a dissimilarity between one or more features of the target environment and the source environment. The method includes (i) extracting one or more features (f1) from a source image associated with a source environment and a target image associated with a target environment, (ii) generating a feature map (ATmap1) based on the one or more features from the source image and the target image, (iii) generating, using an environment classifier, a pixel-wise probability output map (D1) for the one or more features (f1) from the source image and the target image, the pixel-wise probability output map represents a probability of each pixel in the feature map belonging to the source environment, (iv) determining a first environment invariant feature map ($SA_{map1}$) by combining the feature map ($AT_{map1}$) with the pixel-wise probability output map (D1), the environment invariant feature map represents the feature map that is invariant to any environment, (v) determining a second environment invariant feature map ($RS_{map1}$) by combining the first environment invariant feature map ($SA_{map1}$) and the one or more features (f1), (vi) generating one or more second environment invariant feature maps ($RS_{mapn}$) at one or more instances, (vii) extracting one or more environment invariant features based on the one or more second environment invariant feature maps, (viii) detecting the at least one object in the at least one image in the target environment that is adapted to the source environment by training the machine learning model using the environment invariant features, thereby reducing a dissimilarity between the one or more features of the target environment and the source environment.

In some embodiments, the feature map is generated by (i) multiplying a matrix of a key vector with a matrix of a query vector of the one or more features, (ii) converting a multiplication of the key vector and the query vector of the plurality of second features into a probability distribution, and (iii) multiplying the probability distribution with a value vector of the one or more features.

In some embodiments, a loss function is back propagated for retraining the environment classifier, one or more loss functions are determined at the one or more instances.

In some embodiments, the one or more second environment invariant feature maps quantifies a structural alignment for aligning the second environment invariant feature map at each instance.

In some embodiments, the environment invariant features represent the one or more features that are invariant to any environment.

In some embodiments, the feature map represents highlighting the one or more features in a sequence, the one or more instances refers to occurrence of the at least one object in the at least one image.

In some embodiments, the one or more features (f1) include a set of source features of the source image and a set of target features of the target image.

In one aspect, a system for detecting at least one object in at least one image in a target environment that is adapted to a source environment using a machine learning model, thereby reducing a dissimilarity between one or more features of the target environment and the source environment. The system includes a memory that stores a set of instructions and a processor that is configured to execute the set of instructions. The processor is configured to (i) extract one or more features (f1) from a source image associated with a source environment and a target image associated with a target environment, (ii) generate a feature map (ATmap1) based on the one or more features from the source image and the target image, (iii) generate, using an environment classifier, a pixel-wise probability output map (D1) for the one or more features (f1) from the source image and the target image, the pixel-wise probability output map represents a probability of each pixel in the feature map belonging to the source environment, (iv) determine a first environment invariant feature map ($SA_{map1}$) by combining the feature map ($AT_{map1}$) with the pixel-wise probability output map (D1), the environment invariant feature map represents the feature map that is invariant to any environment, (v) determine a second environment invariant feature map ($RS_{map1}$) by combining the first environment invariant feature map ($SA_{map1}$) and the one or more features (f1), (vi) generate one or more second environment invariant feature maps ($RS_{mapn}$) at one or more instances, (vii) extract one or more environment invariant features based on the one or more second environment invariant feature maps, (viii) detect the at least one object in the at least one image in the target environment that is adapted to the source environment by training the machine learning model using the environment invariant features, thereby reducing a dissimilarity between the one or more features of the target environment and the source environment.

In some embodiments, the feature map is generated by (i) multiplying a matrix of a key vector with a matrix of a query vector of the one or more features, (ii) converting a multiplication of the key vector and the query vector of the one or more second features into a probability distribution, and (iii) multiplying the probability distribution with a value vector of the one or more features.

In some embodiments, a loss function is back propagated for retraining the environment classifier, one or more loss functions are determined at the one or more instances.

In some embodiments, the one or more second environment invariant feature maps quantifies a structural alignment for aligning the second environment invariant feature map at each instance.

In some embodiments, the environment invariant features represent the one or more features that are invariant to any environment.

In some embodiments, the feature map represents highlighting the one or more features in a sequence, the one or more instances refers to occurrence of the at least one object in the at least one image.

In some embodiments, the one or more features (f1) include a set of source features of the source image and a set of target features of the target image.

In another aspect, one or more non-transitory computer-readable storage mediums configured with instructions executable by one or more processors to cause the one or more processors to perform a method of detecting at least one object in at least one image in a target environment that is adapted to a source environment using a machine learning model, thereby reducing a dissimilarity between one or more features of the target environment and the source environment. The method includes (i) extracting one or more features (f1) from a source image associated with a source environment and a target image associated with a target environment, (ii) generating a feature map (ATmap1) based on the one or more features from the source image and the target image, (iii) generating, using an environment classifier, a pixel-wise probability output map (D1) for the one or more features (f1) from the source image and the target image, the pixel-wise probability output map represents a probability of each pixel in the feature map belonging to the source environment, (iv) determining a first environment invariant feature map ($SA_{map1}$) by combining the feature map ($AT_{map1}$) with the pixel-wise probability output map (D1), the environment invariant feature map represents the feature map that is invariant to any environment, (v) determining a second environment invariant feature map ($RS_{map1}$) by combining the first environment invariant feature map ($SA_{map1}$) and the one or more features (f1), (vi) generating one or more second environment invariant feature maps ($RS_{mapn}$) at one or more instances, (vii) extracting one or more environment invariant features based on the one or more second environment invariant feature maps, (viii) detecting the at least one object in the at least one image in the target environment that is adapted to the source environment by training the machine learning model using the environment invariant features, thereby reducing a dissimilarity between the one or more features of the target environment and the source environment.

In some embodiments, the feature map is generated by (i) multiplying a matrix of a key vector with a matrix of a query vector of the one or more features, (ii) converting a multiplication of the key vector and the query vector of the one or more second features into a probability distribution, and (iii) multiplying the probability distribution with a value vector of the one or more features.

In some embodiments, a loss function is back propagated for retraining the environment classifier, one or more loss functions are determined at the one or more instances.

In some embodiments, the one or more second environment invariant feature maps quantify a structural alignment for aligning the second environment invariant feature map at each instance.

In some embodiments, the environment invariant features represent the one or more features that are invariant to any environment.

In some embodiments, the feature map represents highlighting the one or more features in a sequence, the one or more instances refers to occurrence of the at least one object in the at least one image.

The system and method are provided to detect objects that are environment adaptive while reducing the dissimilarity between features of the target and the source environments. The detection of objects by the system becomes more robust and accurate across different environments. The system allows a comprehensive representation of images enabling better object detection. The system allows better tracking and detection of objects. The system is adaptable to different environments.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

Figure 1:
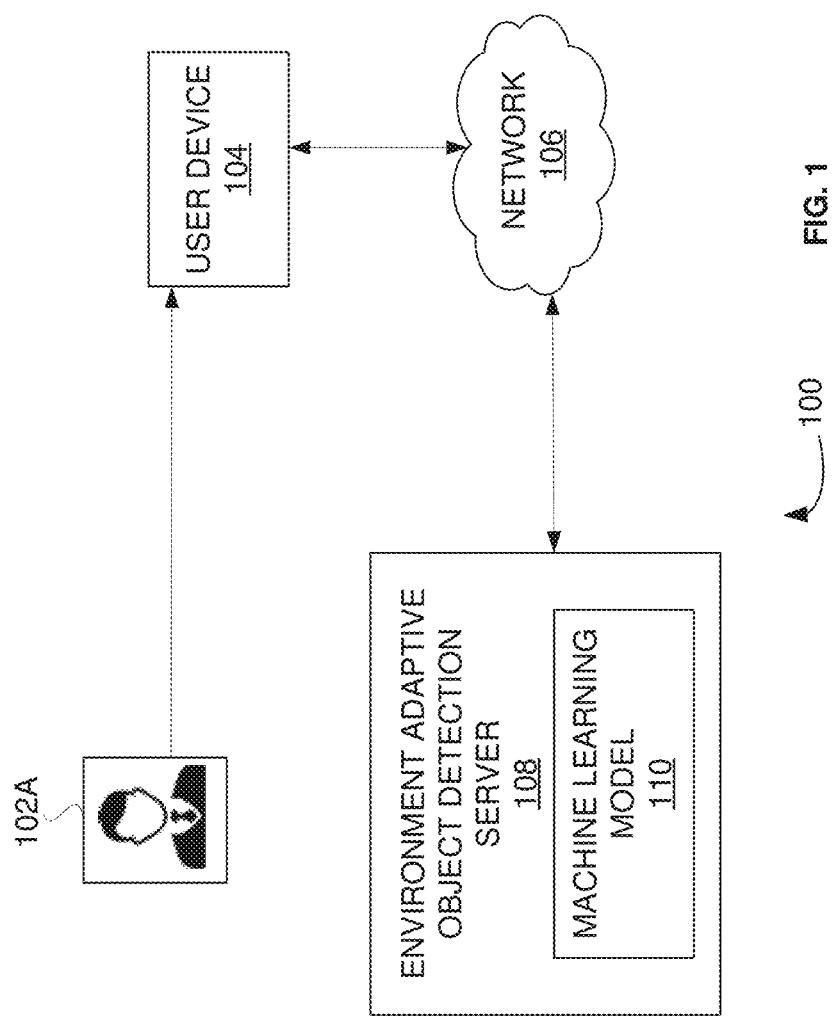
FIG. 1 illustrates a system for detecting an object in an image in a target environment that is adapted to a source environment using a machine learning model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method detecting an object in an image in a target environment that is adapted to a source environment using a machine learning model. The embodiments herein achieve this by proposing a system and a method for detecting an object in the image in an environment adaptive model using a machine learning model according to some embodiments herein. Referring now to the drawings, and more particularly to FIGS. 1 through 7, where similar reference characters denote corresponding features consistently throughout the figures, there are shown preferred embodiments.

FIG. 1 illustrates a system 100 for detecting an object in an image in a target environment that is adapted to a source environment using a machine learning model 110 according to some embodiments herein. The system 100 includes a user device 104, and an environment adaptive object detection server 108. The environment adaptive object detection server 108 includes a memory and a processor. The memory includes a database that stores a set of instructions.

The user device 104 receives a source image and a target image from a user 102. In some embodiments, the user device 104 may be but is not limited to a mobile phone, a tablet, a Personal computer, or a laptop. The user device 104 is communicatively connected to the environment adaptive object detection server 108 through a network 106. The network may be wired or wireless network. The environment adaptive object detection server 108 receives the input image from the user device 104 through the network 106. The environment adaptive object detection server 108 receives the source image and the target image from the user device 104 associated with the user 102. The source image may include objects, environment, and background. The environment may be a domain. The environment may be defined by a specific set of images that share common characteristics or features. The features may be a type of objects that are present, lighting conditions, camera viewpoint, and other environmental factors.

The processor executes the set of instructions and implements a machine learning model 110. The environment adaptive object detection server 108 extracts features (f1) from the source image associated with a source environment and the target image associated with a target environment. The features may be for example, color histograms, local binary patterns like texture and shape in images, visual patterns, object-level information, edges in images, corners in images, blobs, etc.

The environment adaptive object detection server 108 generates a feature map (ATmap1) based on the one or more features from the source image and the target image. The feature map may include highlights of the one or more features. For example, the feature map highlights regions of the image that include objects, while suppressing regions that include background or noise. The feature map may be self-attentive.

The environment adaptive object detection server 108 generates a pixel-wise probability output map (D1) for the one or more features (f1) from the source image and the target image using an environment classifier. The pixel-wise probability output map represents the probability of each pixel in the feature map belonging to the source environment.

For example, the probability may indicate a likelihood that the pixel belongs to an instance of the object. The pixel-wise probability output map may be a binary image, where pixels that belong to the object are labeled as 1, and pixels that belong to the background are labeled as 0.

The environment adaptive object detection server 108 determines a first environment invariant feature map ($SA_{map1}$) by combining the feature map ($AT_{map1}$) with the pixel-wise probability output map (D1). The first environment invariant feature map represents the feature map that is invariant to any environment. For example, the object is a person in the image and the source environment is a cityscape with buildings, and streets as background, while the target environment is also the same cityscape with buildings, and streets as background, but in a foggy environment. The first environment invariant feature map may highlight the person's shape and pose while ignoring the differences in the background. The first environment invariant feature map is generated using the following equation.

$$SA_{map1} = AT_{map1} \times D1$$

The environment adaptive object detection server 108 determines a second environment invariant feature map ($RS_{map1}$) by combining the first environment invariant feature map ($SA_{map1}$) and the one or more features (f1). For example, if the object is a person in the image and the source environment is a cityscape with buildings, and streets as background, while the target environment is also the same cityscape with buildings, and streets as the background but in a foggy environment, then the second environment invariant feature map include highlights of the overall appearance of the person while ignoring the differences in the background and the pose. The second environment invariant feature map is generated using the following equation.

$$RS_{map1} = SA_{map1} \times f1$$

The environment adaptive object detection server 108 generates one or more second environment invariant feature maps ($RS_{mapn}$) at one or more instances. For example, when multiple people include in the image, then the instances refer to each person in the image. The one or more second environment invariant feature maps highlight each person's appearance and distinctive features. The one or more second environment invariant feature maps are generated using the following equation.

$$RS_{mapn} = SA_{mapn} \times fn$$

The environment adaptive object detection server 108 extracts one or more environment invariant features based on the one or more second environment invariant feature maps. For example, if the image includes the faces of people, then the one or more environment invariant features are information about the shape, size, and location of facial features such as eyes, nose, and mouth and overall facial structure. The one or more environment invariant features are generated using the following equation.

$$fn = Fn(RS_{mapn})$$

The environment adaptive object detection server 108 detects the at least one object in the at least one image in the target environment that is adapted to the source environment by training the machine learning model 110 using the environment invariant features. Thereby, the dissimilarity between the one or more features (f1) of the target environment and the source environment is reduced.

Figure 2:
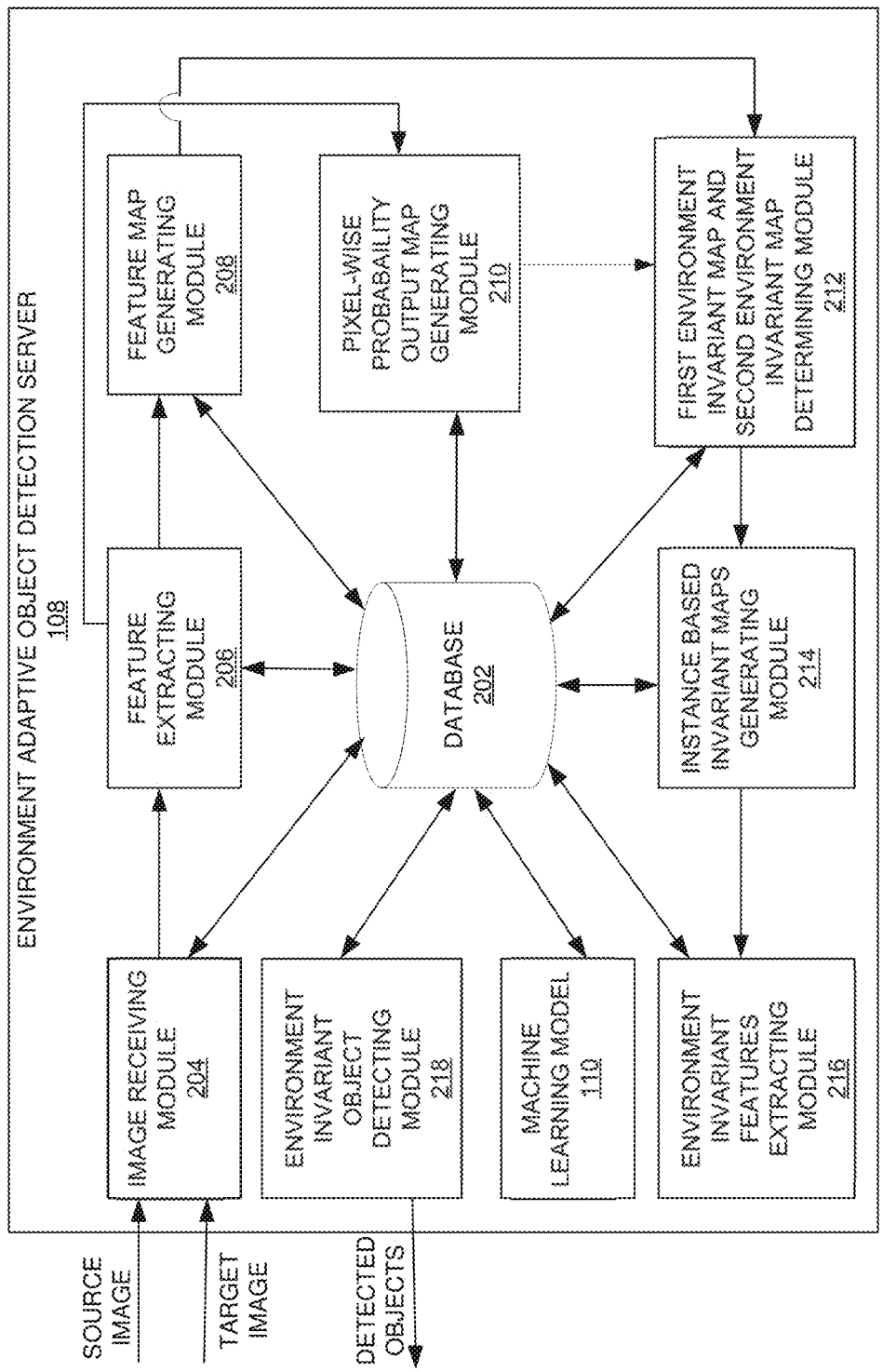
FIG. 2 illustrates a block diagram of an environment adaptive object detection server of the system of FIG. 1 according to some embodiments herein.

FIG. 2 illustrates a block diagram of an environment adaptive object detection server 108 according to some embodiments herein. The environment adaptive object detection server 108 includes a database 202, an image receiving module 204, a feature extracting module 206, a feature map generating module 208, a pixel-wise probability output map generating module 210, a first environment invariant map, and a second environment invariant map determining module 212, an instance based invariant maps generating module 214, an environment invariant features extracting module 216, the machine learning model 110, and an environment invariant object detecting module 218.

The image receiving module 204 receives the source image and the target image from the user device 104 associated with the user 102. The database stores the source image and the target image.

The feature extracting module 206 extracts features (f1) from a source image associated with a source environment and a target image associated with a target environment.

The feature map generating module 208 generates a feature map (ATmap1) based on the one or more features from the source image and the target image. The feature map may include highlights of the one or more features.

In some embodiments, the feature map is generated by (i) multiplying a matrix of a key vector with a matrix of a query vector of the one or more features, (ii) converting a multiplication of the key vector (K) and the query vector (Q) of the one or more second features into a probability distribution, and (iii) multiplying the probability distribution with a value vector (V) of the one or more features. The feature maps are generated using the following equations.

$$QK_1 = Q_1 \times K_1$$

$$AT_{map1} = \text{softmax}(QK_1) \times V_1$$

The pixel-wise probability output map generating module 210 generates a pixel-wise probability output map (D1) for the one or more features (f1) from the source image and the target image using an environment classifier. In some embodiments, a loss function is back propagated for retraining the environment classifier. The loss function is derived from the following equation.

$$L_1 = \Sigma_{i=1}^{n_s} \log(D_1(F_1(x_i^s)))^2 + \Sigma_{i=1}^{n_t} \log((1 - D_1(F_1(x_i^t))))^2$$

The one or more loss functions are determined at the one or more instances. The following equation is used to derive the one or more loss functions at the one or more instances.

$$L_{ins} = -\sum_{i=1}^{n_s}\sum_j \log(D_{ins}(f_{ins}^s)_j) - \sum_{i=1}^{n_t}\sum_j \log(1 - D_{ins}(f_{ins}^t)_j)$$

The first environment invariant map and second environment invariant map determining module 212 determine a first environment invariant feature map ($SA_{map1}$) by combining the feature map ($AT_{map1}$) with the pixel-wise probability output map (D1). The first environment invariant feature map represents the feature map that is invariant to any environment.

The first environment invariant map and second environment invariant map determining module 212 determine a second environment invariant feature map ($RS_{map1}$) by combining the first environment invariant feature map ($SA_{map1}$) and the one or more features (f1).

The instance based invariant maps generating module 214 generates one or more second environment invariant feature maps ($RS_{mapn}$) at one or more instances. For example, the following equation depicts $RS_{mapn}$.

$$RS_{mapn} = SA_{map_n} \times f_n$$

The environment invariant features extracting module 216 extracts one or more environment invariant features based on the one or more second environment invariant feature maps.

The environment invariant object detecting module 218 detects the at least one object in the at least one image in the target environment that is adapted to the source environment by training the machine learning model 110 using the environment invariant features. Thereby, the dissimilarity between the one or more features of the target environment and the source environment is reduced.

Figure 3:
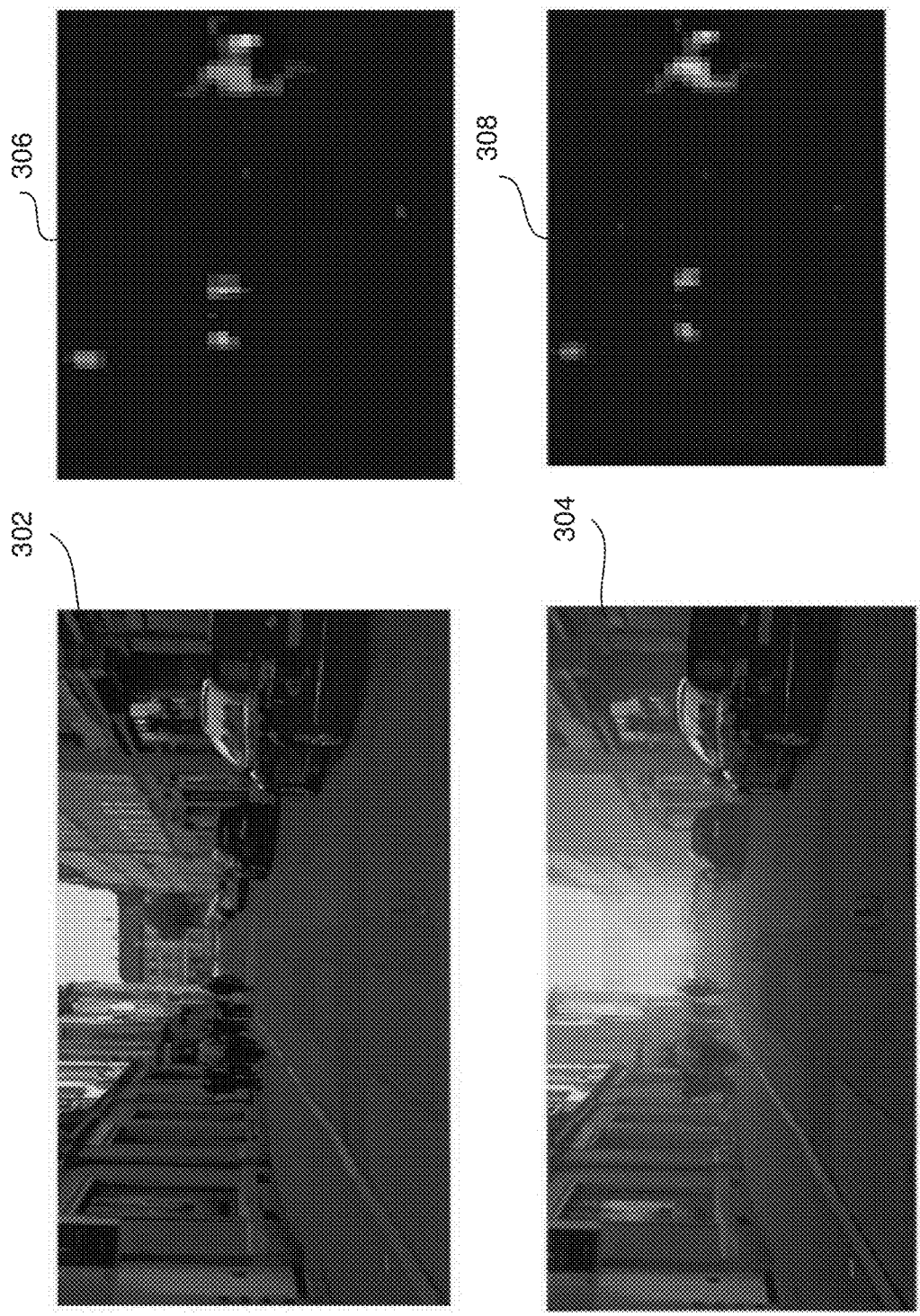
FIG. 3 illustrates exemplary views of feature maps, a source image, and a target image according to some embodiments herein.

FIG. 3 illustrates exemplary views of feature maps, a source image, and a target image according to some embodiments herein. The exemplary view of the source image is depicted at 302. The source image may be a cityscape. The exemplary view of the target image is depicted at 304. The target image may be a foggy cityscape. The exemplary view of corresponding environment invariant feature maps is depicted at 306, 308. The corresponding environment invariant feature maps highlight important features at different instances for both the source image and the target image irrespective of the environment gap due to foggy weather. The environment invariant feature maps depicted at 306, and 308 are instance features, that is features obtained at different instances.

The following Table 1 depicts an improvement of weather adaptation of the system 100 when compared with other existing systems. The improvement is 1.5% and 22% in mAps as compared to the other existing systems.

TABLE 1

| Method | person | rider | car | truck | bus | train | mcycle | bicycle | mAp |
|---|---|---|---|---|---|---|---|---|---|
| Faster R-CNN (source) | 24.4 | 25.4 | 32.6 | 10.8 | 30.5 | 9.1 | 15.2 | 28.3 | 22.0 |
| MTOR (ICVV'19) | 30.6 | 41.4 | 44.0 | 21.9 | 38.6 | 40.6 | 28.3 | 35.6 | 35.1 |
| AFL (AAAI'21) | 34.1 | 44.4 | 51.9 | 30.4 | 41.8 | 25.7 | 30.3 | 37.2 | 37.0 |
| DMLP (ECCV'20) | 32.0 | 42.1 | 43.9 | 31.3 | 44.1 | 43.4 | 37.4 | 36.6 | 38.8 |
| ATFR (ECCV'20) | 34.6 | 43.3 | 50.0 | 23.7 | 47.0 | 38.7 | 33.4 | 38.8 | 38.7 |
| PDA (ECVV'20) | 36.4 | 47.3 | 51.7 | 22.8 | 47.6 | 34.1 | 36.0 | 38.7 | 39.3 |
| SDA (CVPR'19) | 33.5 | 38.0 | 48.5 | 26.8 | 39.0 | 23.3 | 28.0 | 33.6 | 33.8 |
| ICR-CCR (CVPR'20) | 32.9 | 43.8 | 49.2 | 27.2 | 45.1 | 36.4 | 30.3 | 34.6 | 37.4 |
| HTCN (CVPR'20) | 33.2 | 47.4 | 47.9 | 31.6 | 47.5 | 40.9 | 32.3 | 37.1 | 39.8 |
| RPN-PR (CVPR'21) | 33.3 | 45.6 | 50.5 | 30.4 | 43.6 | 42.0 | 29.7 | 36.8 | 39.0 |
| DSA (CVPR'21) | 42.9 | 51.2 | 53.6 | 33.6 | 49.2 | 18.9 | 36.2 | 41.8 | 40.9 |

TABLE 1-continued

| Method | person | rider | car | truck | bus | train | mcycle | bicycle | mAp |
|---|---|---|---|---|---|---|---|---|---|
| MeGA-CDA (CVPR'21) | 37.7 | 49.0 | 52.4 | 25.4 | 49.2 | 46.9 | 34.5 | 39.0 | 41.8 |
| CGD (AAAI'21) | 38.0 | 47.4 | 53.1 | 34.2 | 47.5 | 41.1 | 38.3 | 38.9 | 42.3 |
| system 100 | 35.8 | 45.1 | 54.3 | 34.5 | 49.7 | 50.3 | 38.7 | 42.0 | 43.8 |
| Faster R-CNN (oracle) | 36.2 | 47.7 | 53.0 | 34.7 | 51.9 | 41.0 | 36.8 | 37.8 | 42.4 |
| Faster R-CNN (source) | 26.9 | 16.7 | 44.7 | 17.4 | 22.1 | — | 17.1 | 18.8 | 23.4 |
| ICR-CCR | 31.4 | 18.9 | 46.3 | 19.5 | 31.3 | — | 17.3 | 23.8 | 26.9 |
| AFL | 32.4 | 32.6 | 50.4 | 20.6 | 23.4 | — | 18.9 | 25.0 | 29.0 |
| ILLUME | 33.2 | 20.5 | 47.8 | 20.8 | 33.8 | — | 24.4 | 26.7 | 29.6 |

TABLE 2

| Method | AP on car |
|---|---|
| Faster R-CNN (source) | 34.6 |
| ATFR | 42.8 |
| HTCN | 42.5 |
| AFL | 43.1 |
| DSA | 44.5 |
| MeGA-CDA | 44.8 |
| RPN-PR | 45.7 |
| iFAN | 47.1 |
| CGD | 48.8 |
| System 100 | 53.1 |

The table 2 depicts an improvement of the synthetic data adaptation of the system 100 when compared with other existing systems. The improvement is 4.3% in mAps as compared to the other existing systems.

TABLE 3

| Method | person | rider | car | truck | bus | train | mcycle | bicycle | mAp |
|---|---|---|---|---|---|---|---|---|---|
| Faster R-CNN (source) | 26.9 | 16.7 | 44.7 | 17.4 | 22.1 | — | 17.1 | 18.8 | 23.4 |
| ICR-CCR | 31.4 | 18.9 | 46.3 | 19.5 | 31.3 | — | 17.3 | 23.8 | 26.9 |
| AFL | 32.4 | 32.6 | 50.4 | 20.6 | 23.4 | — | 18.9 | 25.0 | 29.0 |
| System 100 | 33.2 | 20.5 | 47.8 | 20.8 | 33.8 | — | 24.4 | 26.7 | 29.6 |

The table 3 depicts an improvement in scene adaptation of the system 100 when compared with other existing systems.

Figure 4:
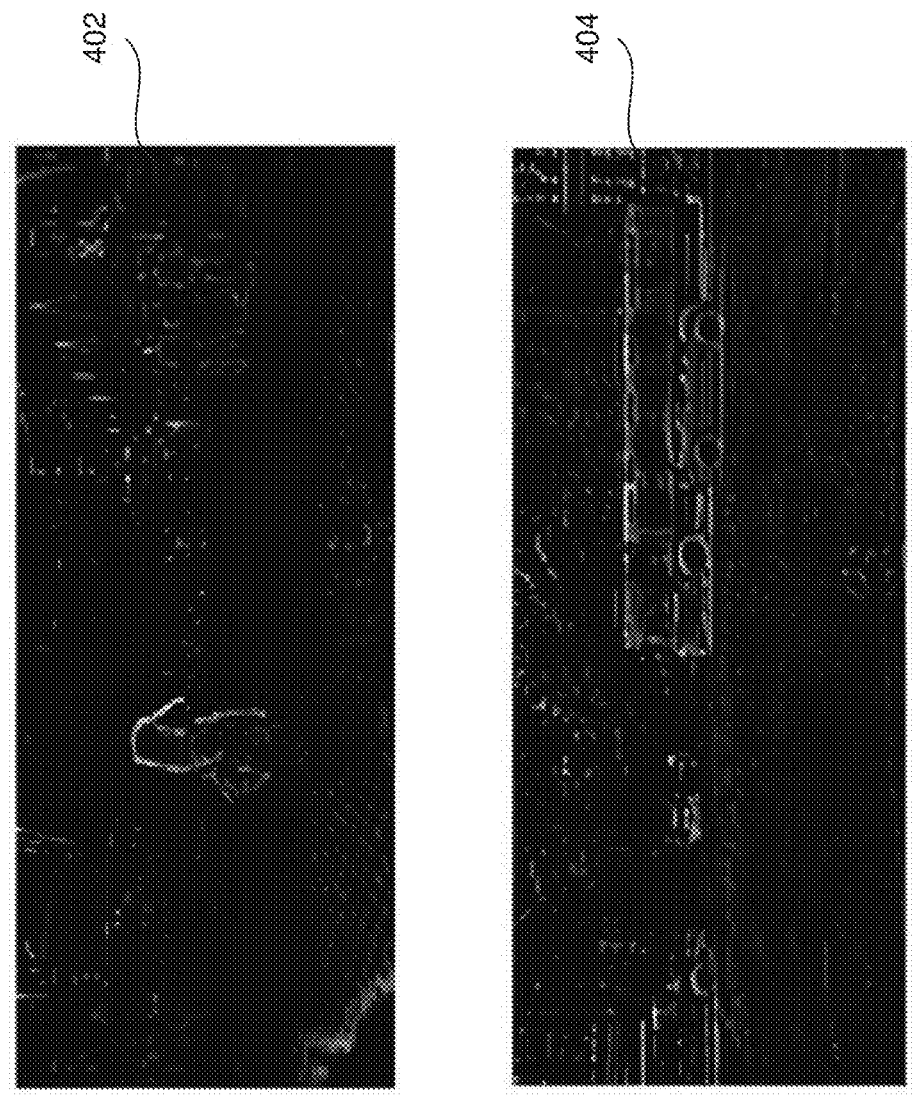
FIG. 4 illustrates exemplary views of feature map according to some embodiments herein.

FIG. 4 illustrates exemplary views of environment invariant feature maps according to some embodiments herein. The exemplary views of the environment invariant feature maps are depicted at 402 and 404. The environment invariant feature maps may be self-attentive feature maps. The environment invariant feature maps specifically highlight instances or objects or regions such as persons or cars or buses within an image for aligning the instances between a source environment and a target environment. The feature map is generated based on the one or more features (f1) extracted from a source image associated with the source environment and a target image associated with the target environment.

Figure 5:
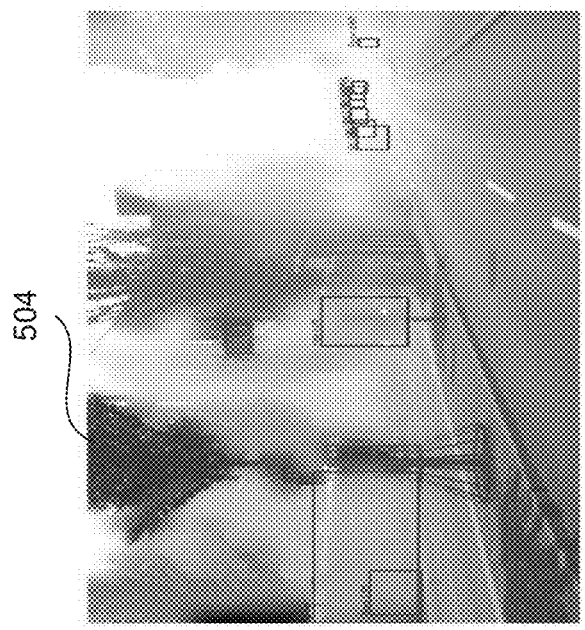
FIG. 5 illustrates exemplary views of object detection in target images according to some embodiments herein.
Figure 5:
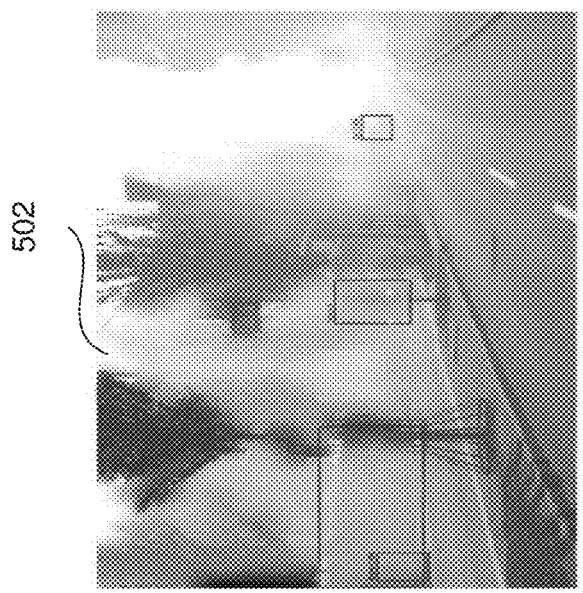

FIG. 5 illustrates exemplary views of object detection in target images according to some embodiments herein. The exemplary view of an existing object detection system in a target image is depicted at 502. The exemplary view of the object detection system 100 in the target image is depicted at 504. The objects are detected in the target image. The target image may be a foggy cityscape. The machine learning model 110 is trained by one or more environment invariant features that are extracted by the system 100.

Thereby, the objects that are detected in the target image at 504 are more accurate when compared to the objects that are detected in the target image 502.

Figure 6:
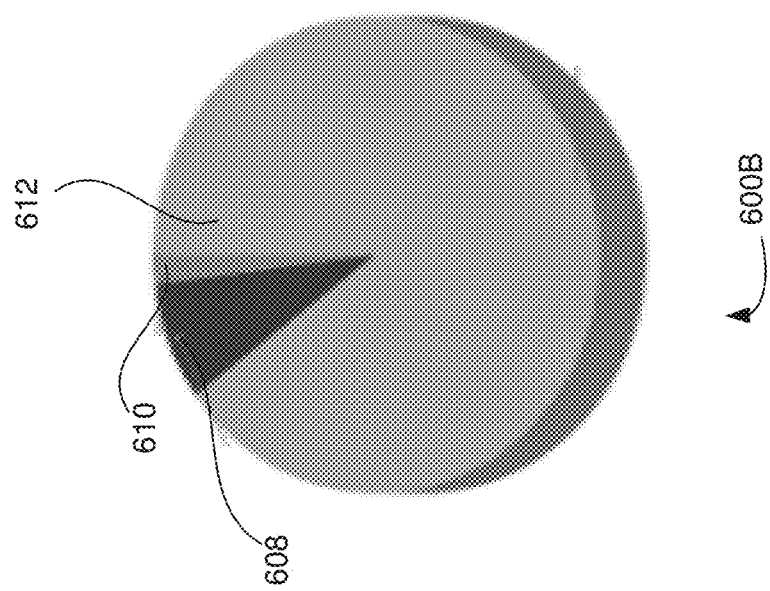
FIG. 6 is a pie chart illustration of misalignment error in images due to different environments according to some embodiments herein.
Figure 6:
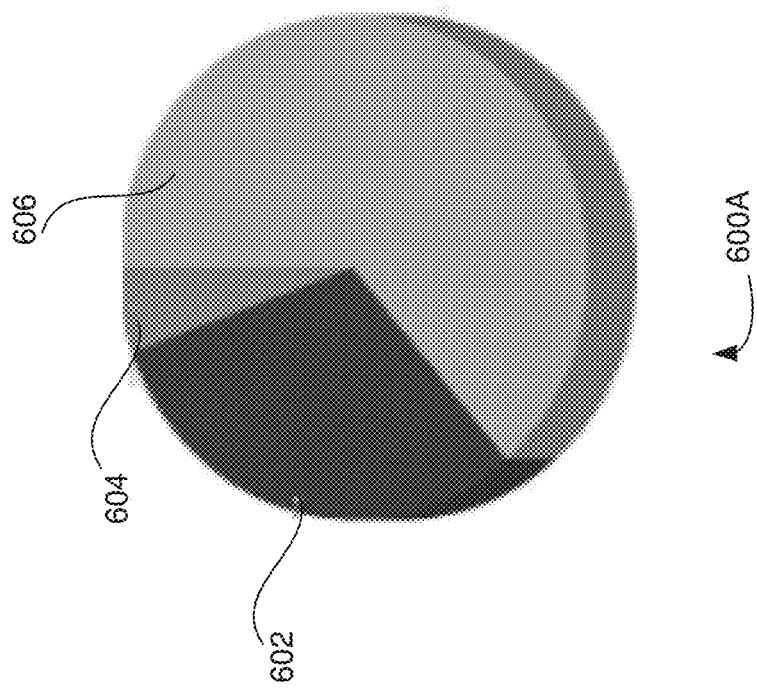

FIG. 6 is a pie chart illustration 600A, and 600B of misalignment errors in images due to different environments according to some embodiments herein. The pie chart illustration 600A of misalignment error in images due to an existing object detection system is depicted as shown in the figure. The pie chart illustration 600B of misalignment error in images due to an existing object detection system is depicted as shown in the figure. The object train in the source image is aligned to the object train in the target image by the existing object detection system is depicted at 602. The object train at other instances in the source image is aligned to the object train at other instances in the target image by the existing object detection system depicted at 604. The object bus in the source image is aligned to the object bus in the target image by the existing object detection system is depicted at 606. The object train in the source image is aligned to the object train in the target image by the system 100 is depicted at 608. The object train at other instances in the source image is aligned to the object train at other instances in the target image by the system 100 is depicted at 610. The object bus in the source image is aligned to the object bus in the target image by the system 100 is depicted at 612.

For example, 500 image samples from a source environment and target environment each are provided to the system 100. The image features are extracted. The instance-level environment invariant features are aligned to the target environment. For this, sample 100 ground truth instances for each category are extracted by the existing object detection system. The features for an object train in the source image are misaligned with the object bus in the target image. The system 100 aligns target instance features for the bus from a separate cluster and source features for the train at 608 align perfectly with the correct target—train at 612 instead of some other instance like the bus. The misalignment error is reduced to 26.4% when compared to 606 and 612. With this metric, domain distances computed are 8.1 and 6.3 using the existing object detection system and the system 100 respectively. The consistency between domain distance, improvement in the accuracy of the instances, and better instance-level feature alignment verifies the motivation for the system 100 and the effectiveness of the system 100.

The system 100 may be implemented for around 4,110 images of 31 categories in different environments, like Amazon, Webcam, and DSLR, and achieved 91% accuracy in detecting objects by aligning features using an adaptive environment.

Figure 7:
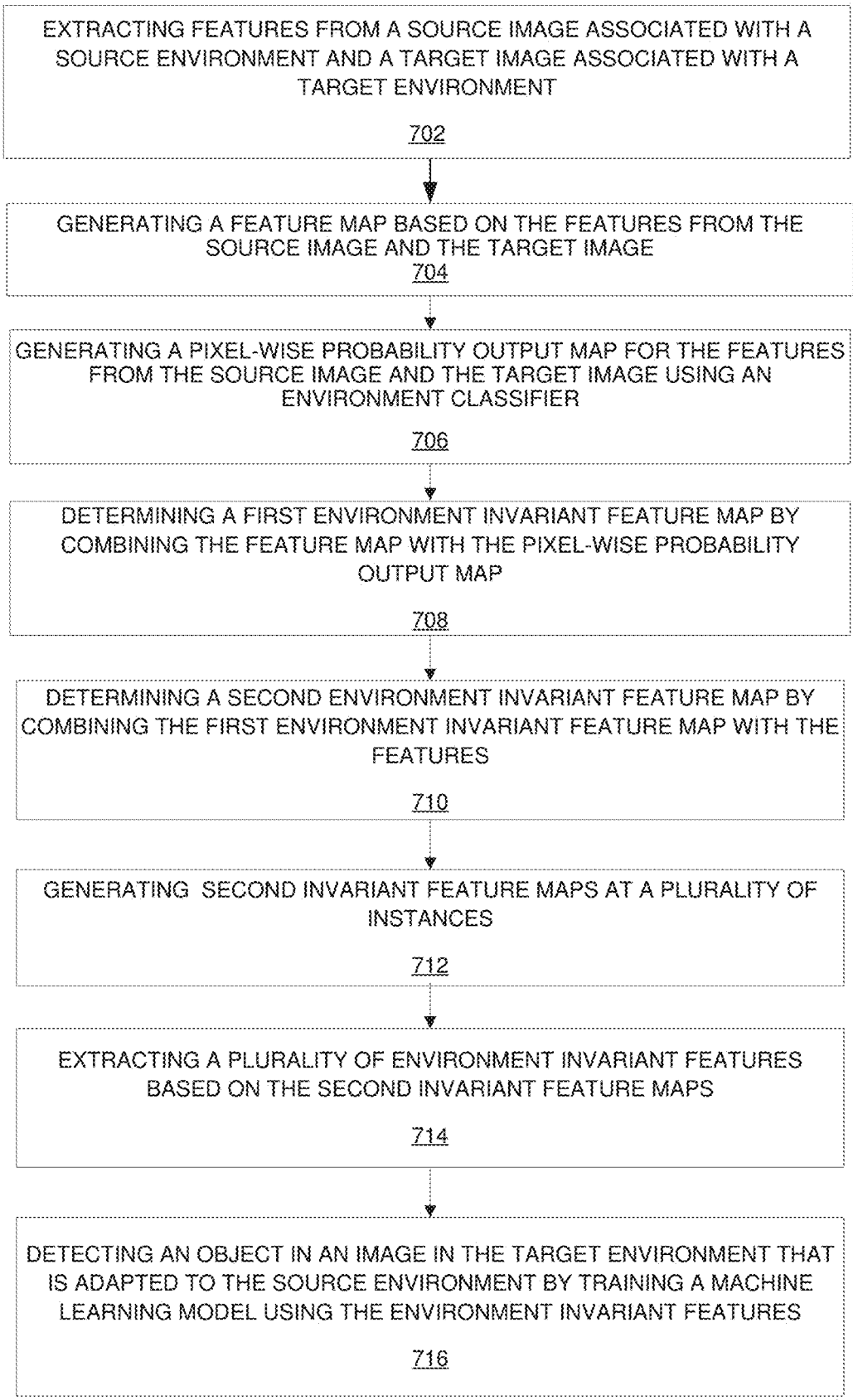
FIG. 7 is a flow diagram that illustrates a method for detecting an object in an image in a target environment that is adapted to a source environment using a machine learning model according to some embodiments herein.
Figure 8:
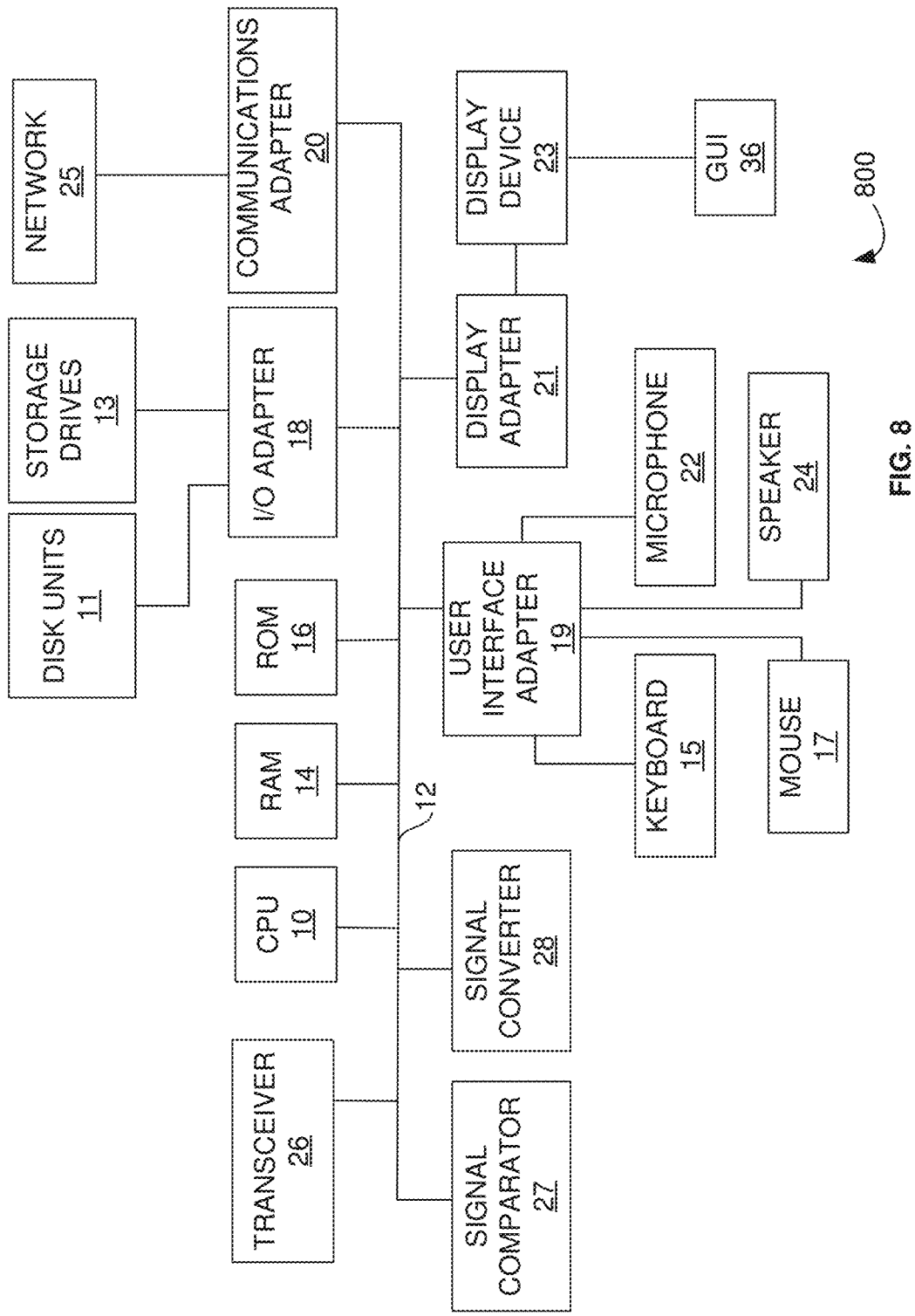
FIG. 8 is a schematic diagram of a computer architecture in accordance with the embodiments herein.

FIG. 7 is a flow diagram that illustrates a method for detecting an object in an image in a target environment that is adapted to a source environment using a machine learning model according to some embodiments herein. At step 702 the method includes extracting one or more features (f1) from a source image associated with a source environment and a target image associated with a target environment. At step 704 the method includes generating a feature map (ATmap1) based on the one or more features from the source image and the target image. At step 706 the method includes generating, using an environment classifier, a pixel-wise probability output map (D1) for the one or more features (f1) from the source image and the target image. The pixel-wise probability output map represents a probability of each pixel in the feature map belonging to the source environment. At step 708 the method includes determining a first environment invariant feature map ($SA_{map1}$) by combining the feature map ($AT_{map1}$) with the pixel-wise probability output map (D1). The environment invariant feature map represents the feature map that is invariant to any environment. At step 710, the method includes determining a second environment invariant feature map ($RS_{map1}$) by combining the first environment invariant feature map ($SA_{map1}$) and the one or more features (f1). At step 712, the method includes generating one or more second environment invariant feature maps ($RS_{mapn}$) at one or more instances. At step 714, the method includes extracting one or more environment invariant features based on the one or more second environment invariant feature maps. At step 716, the method includes detecting the at least one object in the at least one image in the target environment that is adapted to the source environment by training the machine learning model using the environment invariant features, thereby reducing a dissimilarity between the one or more features of the target environment and the source environment.

A representative hardware environment for practicing the embodiments herein is depicted in FIG. 7, with reference to FIGS. 1 through 6. This schematic drawing illustrates a hardware configuration of an environment adaptive object detection server 108/computer system/image capturing device in accordance with the embodiments herein. The image capturing device includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The image capturing device can read the inventive instructions on the program storage devices and follow these instructions to execute the methodology of the embodiments herein. The image capturing device further includes a user interface adapter that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for detecting at least one object in at least one image in a target environment that is adapted to a source environment using a machine learning model, thereby reducing a dissimilarity between a plurality of features of the target environment and the source environment comprising:

extracting a plurality of features (f1) from a source image associated with a source environment and a target image associated with a target environment;

generating a feature map (ATmap1) based on the plurality of features from the source image and the target image;

generating, using an environment classifier, a pixel-wise probability output map (D1) for the plurality of features (f1) from the source image and the target image, wherein the pixel-wise probability output map represents a probability of each pixel in the feature map belonging to the source environment;

determining a first environment invariant feature map ($SA_{map1}$) by combining the feature map ($AT_{map1}$) with the pixel-wise probability output map (D1), wherein the environment invariant feature map represents the feature map that is invariant to any environment;

determining a second environment invariant feature map ($RS_{map1}$) by combining the first environment invariant feature map ($SA_{map1}$) and the plurality of features (f1);

generating a plurality of second environment invariant feature maps ($RS_{mapn}$) at a plurality of instances;

extracting a plurality of environment invariant features based on the plurality of second environment invariant feature maps; and detecting the at least one object in the at least one image in the target environment that is adapted to the source environment by training the machine learning model using the plurality of environment invariant features, thereby reducing a dissimilarity between the plurality of features of the target environment and the source environment.

2. The processor-implemented method of claim 1, wherein the feature map is generated by (i) multiplying a matrix of a key vector with a matrix of a query vector of the plurality of features, (ii) converting a multiplication of the key vector and the query vector of the plurality of second features into a probability distribution, and (iii) multiplying the probability distribution with a value vector of the plurality of features.

3. The processor-implemented method of claim 1, wherein a loss function is back propagated for retraining the environment classifier, wherein a plurality of loss functions is determined at the plurality of instances.

4. The processor-implemented method of claim 1, wherein the plurality of second environment invariant feature maps quantifies a structural alignment for aligning the second environment invariant feature map at each instance.

5. The processor-implemented method of claim 1, wherein the environment invariant features represent the plurality of features that are invariant to any environment.

6. The processor-implemented method of claim 1, wherein the feature map represents highlighting the plurality of features in a sequence, wherein the plurality of instances refers to occurrence of the at least one object in the at least one image.

7. The processor-implemented method of claim 1, wherein the plurality of features (f1) comprises a set of source features of the source image and a set of target features of the target image.

8. A system for detecting at least one object in at least one image in a target environment that is adapted to a source environment using a machine learning model, thereby reducing a dissimilarity between a plurality of features of the target environment and the source environment, comprising:
a memory that stores a set of instructions; and
a processor that is configured to execute the set of instructions to
extract a plurality of features (f1) from a source image associated with a source environment and a target image associated with a target environment;
generate a feature map (ATmap1) based on the plurality of features from the source image and the target image;
generate, using an environment classifier, a pixel-wise probability output map (D1) for the plurality of features (f1) from the source image and the target image, wherein the pixel-wise probability output map represents a probability of each pixel in the feature map belonging to the source environment;
determine a first environment invariant feature map ($SA_{map1}$) by combining the feature map ($AT_{map1}$) with the pixel-wise probability output map (D1), wherein the environment invariant feature map represents the feature map that is invariant to any environment;
determine a second environment invariant feature map ($RS_{map1}$) by combining the first environment invariant feature map ($SA_{map1}$) and the plurality of features (f1);
generate a plurality of second environment invariant feature maps ($RS_{mapn}$) at a plurality of instances;
extract a plurality of environment invariant features based on the plurality of second environment invariant feature maps; and
detect the at least one object in the at least one image in the target environment that is adapted to the source environment by training the machine learning model using the plurality of environment invariant features, thereby reducing a dissimilarity between the plurality of features of the target environment and the source environment.

9. The system of claim 8, wherein the feature map is generated by (i) multiplying a matrix of a key vector with a matrix of a query vector of the plurality of features, (ii) converting a multiplication of the key vector and the query vector of the plurality of second features into a probability distribution, and (iii) multiplying the probability distribution with a value vector of the plurality of features.

10. The system of claim 8, wherein a loss function is back propagated for retraining the environment classifier, wherein a plurality of loss functions is determined at the plurality of instances.

11. The system of claim 8, wherein the plurality of second environment invariant feature maps quantifies a structural alignment for aligning the second environment invariant feature map at each instance.

12. The system of claim 8, wherein the environment invariant features represent the plurality of features that are invariant to any environment.

13. The system of claim 8, wherein the feature map represents highlighting the plurality of features in a sequence, wherein the plurality of instances refers to occurrence of the at least one object in the at least one image.

14. The system of claim 8, wherein the plurality of features (f1) comprises a set of source features of the source image and a set of target features of the target image.

15. A non-transitory computer-readable storage medium storing a sequence of instructions, which when executed by one or more processors, causes detecting at least one object in at least one image in a target environment that is adapted to a source environment using a machine learning model, thereby reducing a dissimilarity between a plurality of features of the target environment and the source environment comprising:
extracting a plurality of features (f1) from a source image associated with a source environment and a target image associated with a target environment;
generating a feature map (ATmap1) based on the plurality of features from the source image and the target image;
generating, using an environment classifier, a pixel-wise probability output map (D1) for the plurality of features (f1) from the source image and the target image, wherein the pixel-wise probability output map represents a probability of each pixel in the feature map belonging to the source environment;
determining a first environment invariant feature map ($SA_{map1}$) by combining the feature map ($AT_{map1}$) with the pixel-wise probability output map (D1), wherein the environment invariant feature map represents the feature map that is invariant to any environment;
determining a second environment invariant feature map ($RS_{map1}$) by combining the first environment invariant feature map ($SA_{map1}$) and the plurality of features (f1);
generating a plurality of second environment invariant feature maps ($RS_{mapn}$) at a plurality of instances;
extracting a plurality of environment invariant features based on the plurality of second environment invariant feature maps; and detecting the at least one object in the at least one image in the target environment that is adapted to the source environment by training the machine learning model using the plurality of environment invariant features, thereby reducing a dissimilarity between the plurality of features of the target environment and the source environment.

16. The non-transitory computer readable storage medium storing a sequence of instructions of claim 15, wherein the feature map is generated by (i) multiplying a matrix of a key vector with a matrix of a query vector of the plurality of features, (ii) converting a multiplication of the key vector and the query vector of the plurality of second features into a probability distribution, and (iii) multiplying the probability distribution with a value vector of the plurality of features.

17. The non-transitory computer readable storage medium storing a sequence of instructions of claim 15, wherein a loss function is back propagated for retraining the environment classifier, wherein a plurality of loss functions is determined at the plurality of instances.

18. The non-transitory computer readable storage medium storing a sequence of instructions of claim 15, wherein the plurality of second environment invariant feature maps quantifies a structural alignment for aligning the second environment invariant feature map at each instance.

19. The non-transitory computer readable storage medium storing a sequence of instructions of claim 15, wherein the feature map represents highlighting the plurality of features in a sequence, wherein the plurality of instances refers to occurrence of the at least one object in the at least one image.

20. The non-transitory computer readable storage medium storing a sequence of instructions of claim 15, wherein the plurality of features (f1) comprises a set of source features of the source image and a set of target features of the target image.

* * * * *